US009260999B2

(12) United States Patent
Plati et al.

(10) Patent No.: US 9,260,999 B2
(45) Date of Patent: Feb. 16, 2016

(54) APPARATUS AND METHOD FOR ENGINE BACKPRESSURE REDUCTION

(71) Applicant: Vida Holdings Corp. Ltd., Woodbridge (CA)

(72) Inventors: Stefano Plati, Woodbridge (CA); Voislav Blagojevic, Toronto (CA); Gregory Kiyoshi Koyanagi, Toronto (CA)

(73) Assignee: Vida Fresh Air Corp., Woodbridge, Ontario (CA)

( * ) Notice: Subject to any disclaimer, the term of this patent is extended or adjusted under 35 U.S.C. 154(b) by 112 days.

(21) Appl. No.: 14/359,540

(22) PCT Filed: Jul. 19, 2013

(86) PCT No.: PCT/CA2013/000663
§ 371 (c)(1),
(2) Date: May 20, 2014

(87) PCT Pub. No.: WO2014/012174
PCT Pub. Date: Jan. 23, 2014

(65) Prior Publication Data
US 2014/0290218 A1    Oct. 2, 2014

Related U.S. Application Data

(60) Provisional application No. 61/673,394, filed on Jul. 19, 2012, provisional application No. 61/675,483, filed on Jul. 25, 2012, provisional application No. 61/830,409, filed on Jun. 3, 2012, provisional application No. 61/839,083, filed on Jun. 25, 2013.

(51) Int. Cl.
*F01N 3/00*    (2006.01)
*F01N 3/08*    (2006.01)
(Continued)

(52) U.S. Cl.
CPC *F01N 3/08* (2013.01); *B01D 53/94* (2013.01); *F01N 3/2828* (2013.01); *F01N 3/2892* (2013.01); *F01N 2260/06* (2013.01); *F01N 2260/14* (2013.01); *F01N 2330/60* (2013.01)

(58) Field of Classification Search
CPC ....... F01N 3/2828; F01N 3/2892; F01N 3/08; F01N 2260/06; B01D 53/94
USPC ............................................ 60/274; 422/180
See application file for complete search history.

(56) References Cited

U.S. PATENT DOCUMENTS 5,154,894 A * 10/1992 MacFarlane ............... F01N 3/28
422/171
5,330,728 A * 7/1994 Foster ................ B01D 53/9454
422/177

(Continued)

FOREIGN PATENT DOCUMENTS

DE          10331691       4/2006
DE         102005012066    9/2006
(Continued)

OTHER PUBLICATIONS

International Preliminary Report on Patentability and the Written Opinion of the International Searching Authority for PCT/CA2013000663 dated Jan. 20, 2015.

*Primary Examiner* — Jason Shanske
(74) *Attorney, Agent, or Firm* — Head, Johnson & Kachigian, P.C.

(57) ABSTRACT

An improved catalytic substrate for use with a can in an automotive exhaust system, the substrate being of the type which is disposed in use in the can, the improvement comprising: an insulation material thermally separating the substrate into a central zone and a tubular outer zone surrounding the central zone, the insulation material, central zone and outer zone collectively defining a modified substrate, the insulation material being adapted such that, in an operating condition, the temperature difference across the insulation material is at least 25° C.

22 Claims, 16 Drawing Sheets

(51) Int. Cl.
  *F01N 3/28*  (2006.01)
  *B01D 53/94*  (2006.01)

(56) References Cited

U.S. PATENT DOCUMENTS

| | | | |
|---|---|---|---|
| 5,482,681 A * | 1/1996 | Sager, Jr. | F01N 3/2857 422/177 |
| 6,024,928 A * | 2/2000 | Foster | F01N 3/2053 422/176 |
| 6,391,421 B1 * | 5/2002 | Bruck | B01D 53/9454 428/116 |
| 2003/0097834 A1 | 5/2003 | Gabe et al. | |
| 2004/0076794 A1 | 4/2004 | Hijikata | |
| 2004/0211164 A1 | 10/2004 | Hamanaka et al. | |
| 2005/0247038 A1 * | 11/2005 | Takahashi | B01D 46/2462 55/523 |
| 2011/0129391 A1 * | 6/2011 | Ogyu | B01D 46/2459 422/180 |

FOREIGN PATENT DOCUMENTS

| | | |
|---|---|---|
| EP | 0965736 | 12/1999 |
| EP | 1312776 | 5/2003 |
| EP | 1382374 | 1/2004 |
| EP | 1413345 | 4/2004 |
| EP | 1486242 | 12/2004 |
| JP | 5-61418 | 8/1993 |
| JP | 07-251079 | 10/1995 |
| JP | 2002292225 | 10/2002 |
| JP | 2003161136 | 6/2003 |
| JP | 2009183832 | 8/2009 |
| JP | 2010048111 A * | 3/2010 |

* cited by examiner

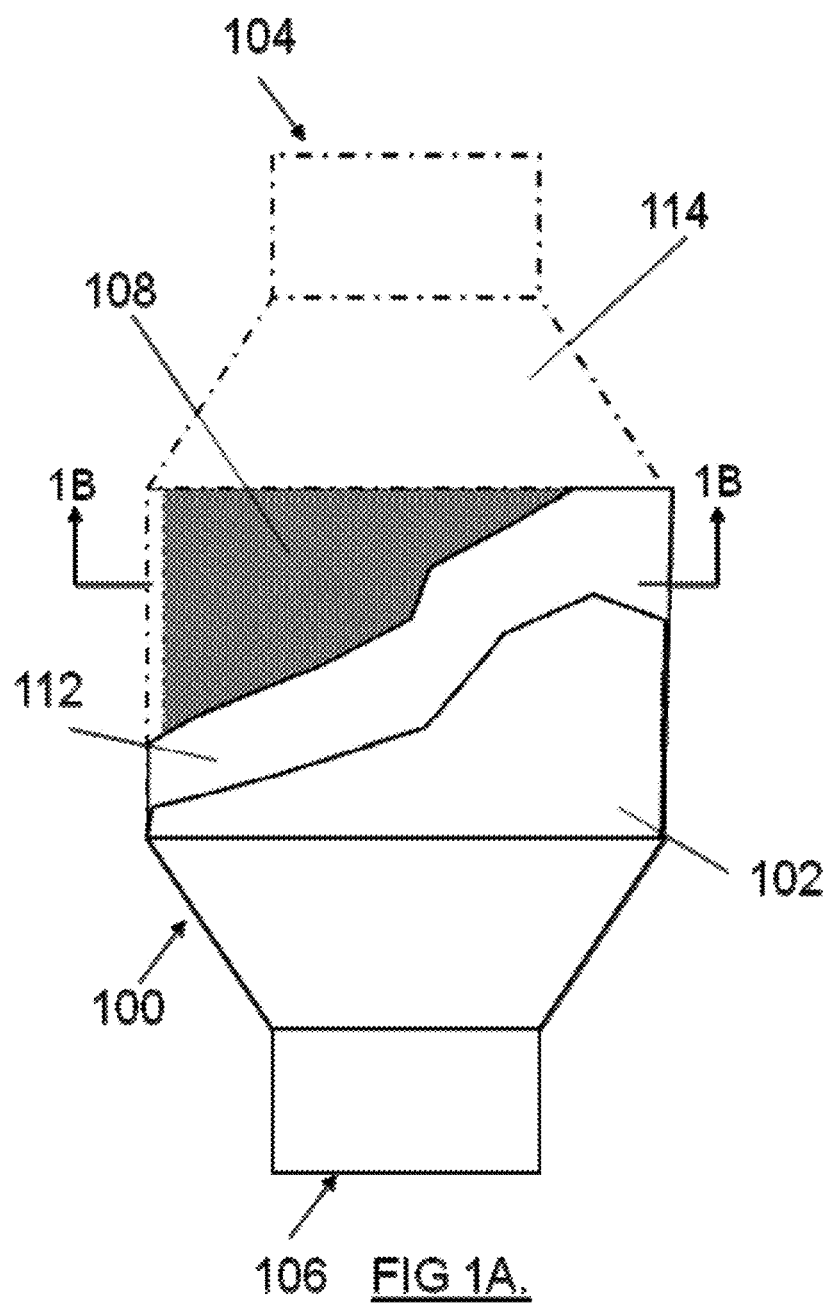

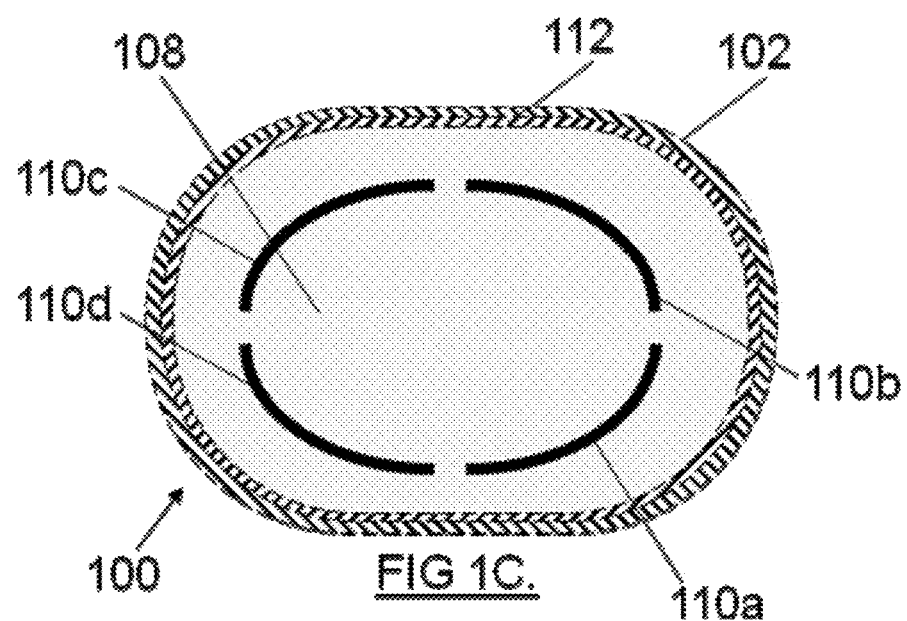

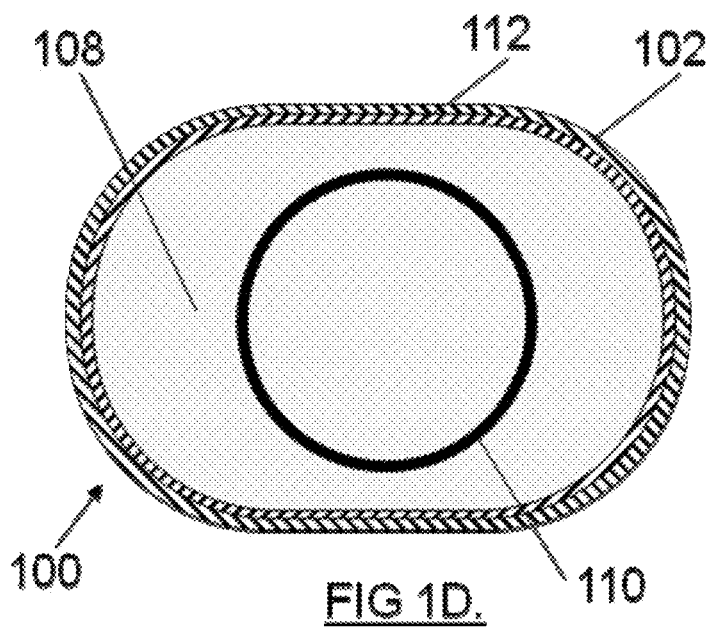

APPARATUS AND METHOD FOR ENGINE BACKPRESSURE REDUCTION

CROSS-REFERENCE TO RELATED APPLICATIONS

This application claims priority upon U.S. Provisional Patent Application Ser. No. 61/675,483, filed Jul. 25, 2012, U.S. Provisional Patent Application Ser. No. 61/673,394, filed Jul. 19, 2012 and upon U.S. Provisional Patent Application Ser. No. 61/830,409, filed Jun. 3, 2013 and U.S. Provisional Patent Application Ser. No. 61/839,083, filed Jun. 25, 2013.

FIELD

The invention relates to the field of catalytic converters.

BACKGROUND

Catalytic converters are widely used in motor vehicle exhaust systems to reduce the toxicity of emissions. In a typical catalytic converter, a substrate takes the form of a porous structure that is coated with catalytic materials. The porous structure is often a ceramic that has been extruded through a die such that a large number of parallel flow channels (cells) are formed. The exhaust gas is expelled by the engine at velocity and is routed to the catalytic converter through an exhaust pipe. The catalytic converter is typically placed in a metal can having a diameter larger than that of the exhaust pipe which is connected to the remainder of the exhaust system by sections of flared pipe called inlet and outlet diffusers.

The interposition of a catalytic converter into the exhaust system can impede gas flow, creating backpressure that can significantly reduce engine power and increase fuel consumption.

SUMMARY OF THE INVENTION

Forming one aspect of the invention is an improved catalytic substrate for use with a can in an automotive exhaust system, the substrate being of the type which is disposed in use in the can. According to this aspect of the invention, the improvement comprises an insulation material thermally separating the substrate into a central zone and a tubular outer zone surrounding the central zone, the insulation material, central zone and outer zone collectively defining a modified substrate, the insulation material being adapted such that, in an operating condition, the gas flow through the modified substrate is characterized by a static pressure that, on the upstream-facing surface of the modified substrate:
  has a peak at a point generally central to the upstream-facing surface of the modified substrate
  as the upstream-facing surface extends radially away from the point to the periphery, decreases, but for: a surge, after the upstream-facing surface extends beyond the insulation material; and edge effects associated with the can.

In this disclosure and in the accompanying claims, "generally central" be understood to encompass a point that is interior of the outer perimeter and that is often, but not exclusively, closer to the centre than to the perimeter.

According to another aspect of the invention, in said operating condition: as the upstream-facing surface extends radially away from the point towards the periphery, the gas static pressure thereon can initially decrease relatively slowly; as the upstream-facing surface further extends, to bridge the insulation material, the gas static pressure thereon can decrease relatively quickly as the upstream-facing surface traverses the insulation material; as the upstream-facing surface further extends, the gas static pressure thereon can then undergo said surge; and as the upstream-facing surface further extends, the gas static pressure thereon can then decrease relatively slowly, but for said edge effects associated with the can.

According to another aspect of the invention, each of the insulation material and the outer zone can be tubular.

According to another aspect of the invention, the ratio of the volume of the central zone to the volume of the outer zone can fall in the range 60:40 to 40:60.

According to another aspect of the invention, the insulation material can be adapted such that, in said operating condition, the temperature difference across the insulation material can be at least 25° C.

According to another aspect of the invention, the insulation material can be adapted such that, in said operating condition, the temperature difference across the insulation material can be between 25° C. and 300° C.

According to another aspect of the invention, in said operating condition, the gas flow through the central zone can be more evenly distributed than the gas flow that would pass therethrough if the insulation portion of the modified substrate was replaced with catalytic material.

Forming another aspect of the invention is an improved catalytic substrate for use with a can in an automotive exhaust system, the substrate being of the type which is disposed in use in the can.

The improvement comprises: an insulation material thermally separating the substrate into a central zone and a tubular outer zone surrounding the central zone, the insulation material, central zone and outer zone collectively defining a modified substrate, the insulation material being adapted such that, in an operating condition, the temperature difference across the insulation material is at least 25° C.

According to another aspect, the thickness of the insulation material can be substantially the width of 2 or 3 cells.

Forming another aspect of the invention is a method for providing for treatment of emissions from an internal combustion engine. The method comprises the step of providing a catalytic converter to receive the exhaust gases from the engine. This converter has a central zone, a tubular outer zone surrounding the central zone; and an insulation material disposed intermediate the central zone and the outer zone. The insulation material is adapted such that, in use, the gas flow through the modified substrate is characterized by a static pressure that, on the upstream-facing surface of the modified substrate:
  has a peak at a point generally central to the upstream-facing surface of the modified substrate
  as the upstream-facing surface extends radially away from the point to the periphery, decreases, but for
    a surge, after the upstream-facing surface extends beyond the insulation material; and
    edge effects associated with the can.

According to another aspect, in said operating condition: as the upstream-facing surface extends radially away from the point towards the periphery, the gas static pressure thereon can initially decrease relatively slowly; as the upstream-facing surface further extends, to bridge the insulation material, the gas static pressure thereon can decrease relatively quickly as the upstream-facing surface traverses the insulation material; as the upstream-facing surface further extends, the gas static pressure thereon can then undergo said surge; and as the upstream-facing surface further extends, the gas static pressure thereon can then decrease relatively slowly, but for said edge effects associated with the can.

According to another aspect of the invention, each of the insulation material and the outer zone can be tubular.

According to another aspect of the invention, the ratio of the volume of the central zone to the volume of the outer zone can fall in the range 60:40 to 40:60.

According to another aspect of the invention, the insulation material can be adapted such that, in said operating condition, the temperature difference across the insulation material can be at least 25° C.

According to another aspect of the invention, the insulation material can be adapted such that, in said operating condition, the temperature difference across the insulation material can be between 25° C. and 300° C.

According to another aspect of the invention, in said operating condition, the gas flow through the central zone can be more evenly distributed than the gas flow that would pass therethrough if the insulation portion of the modified substrate was replaced with catalytic material.

According to another aspect, the thickness of the insulation material can be substantially the width of 2 or 3 cells.

Other aspects and features of the teachings disclosed herein will become apparent, to those ordinarily skilled in the art, upon review of the following description and the appended claims, with reference to the drawings, the latter being described briefly hereinafter.

BRIEF DESCRIPTION OF THE DRAWINGS

FIG. 1A is a side cutaway view of apparatus according to the first exemplary embodiment of the invention;

FIG. 1C is a view similar to FIG. 1B showing a second exemplary embodiment;

FIG. 1D is a view similar to FIG. 1B showing a third exemplary embodiment;

DETAILED DESCRIPTION

Exemplary embodiments of the invention are shown in FIGS. 1A through 2A.

Figure 1B:
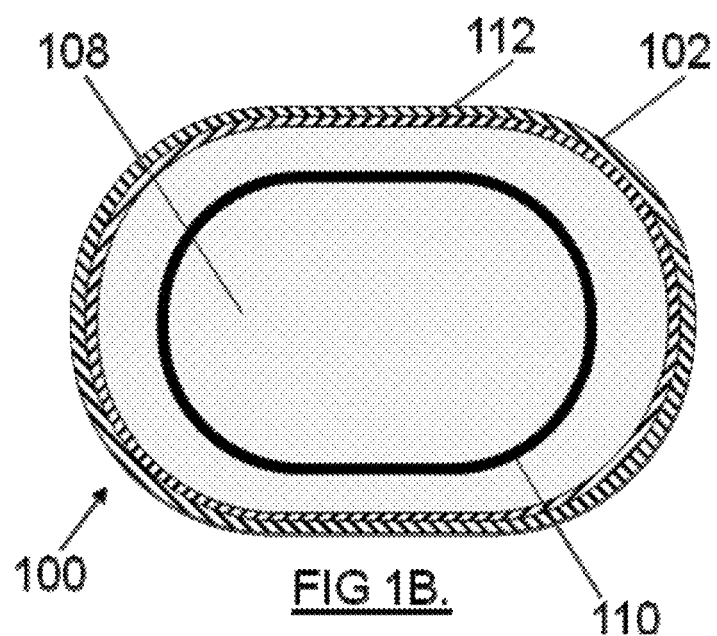
FIG. 1B is a sectional view of the apparatus of FIG. 1A.
Figure 2A:
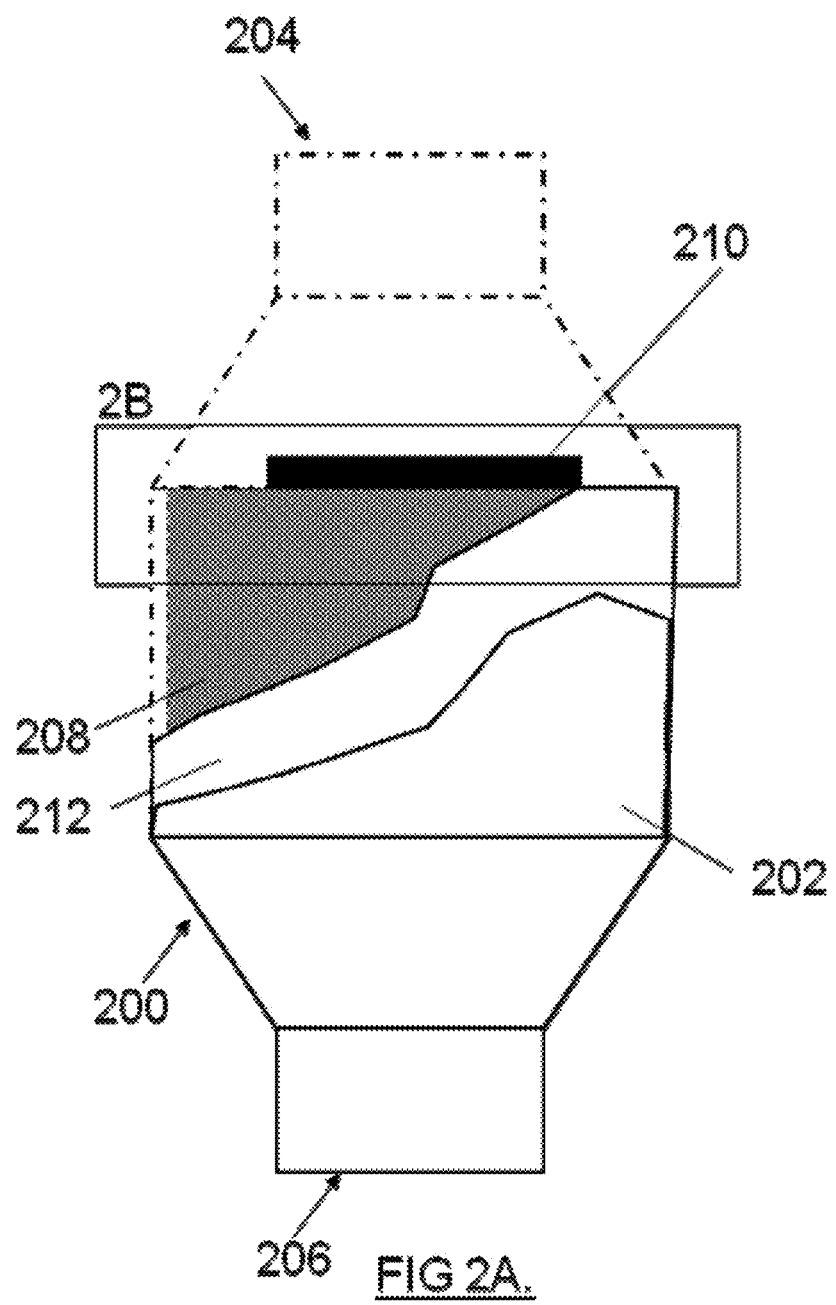
FIG. 2A is a side cutaway view of an apparatus according to a fifth exemplary embodiment.
Figure 3:
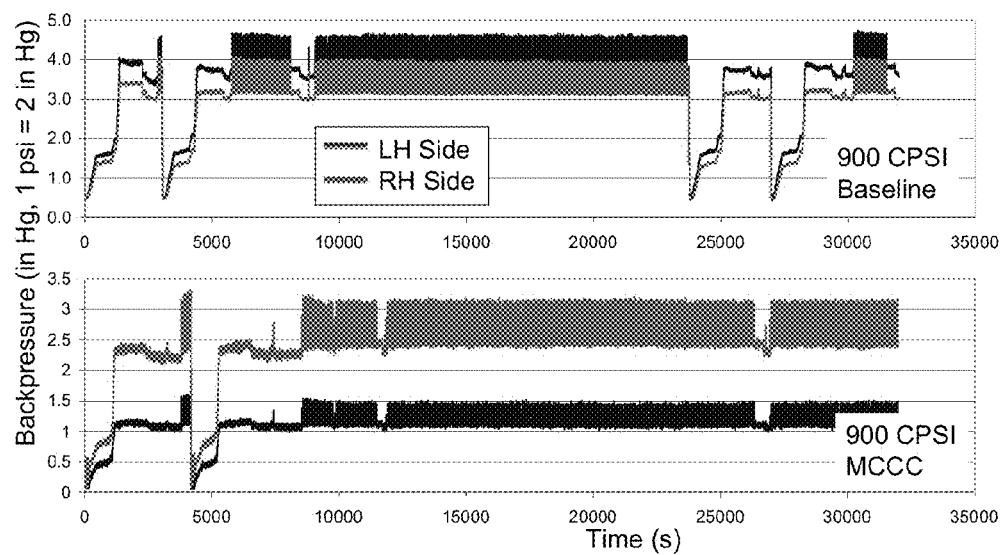
FIG. 3 is a plot of engine backpressure as described in Example 1
Figure 4:
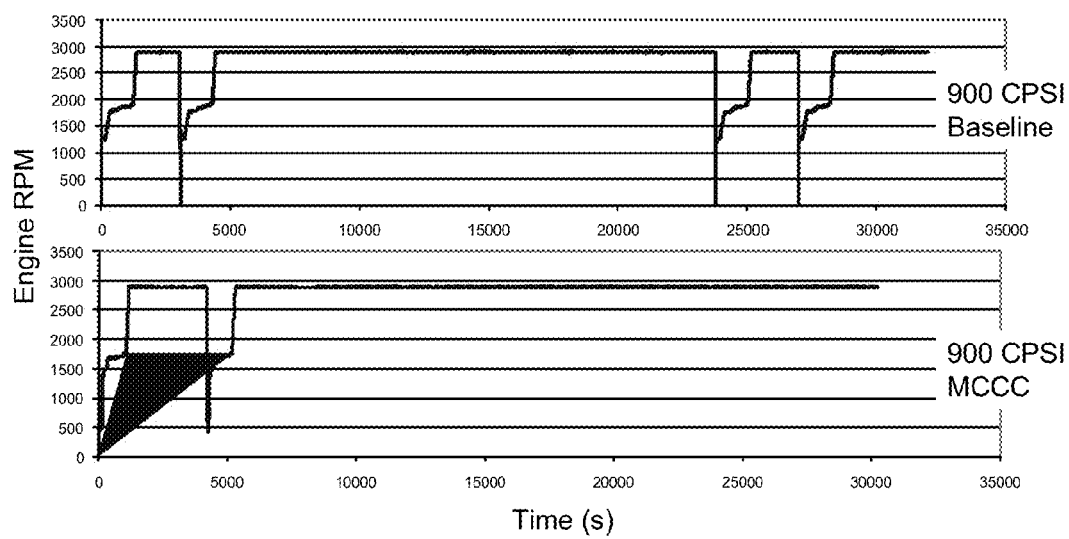
FIG. 4 is a plot of engine RPM for the aging cycle as described in Example 1, the baseline results being shown above and prototype results appearing below

FIGS. 1A, 1B and 2A show a catalytic converter apparatus 100 according to the first exemplary embodiment of the invention.

This apparatus 100 is for use in an exhaust system of an internal combustion engine (not shown) and will be seen to include a housing 102, a gas inlet 104, a gas outlet 106 spaced apart from the inlet 104 and an oval substrate element 108 that substantially fills the housing 102 in a radial or lateral dimension relative to an axis of gas flow from the inlet 104 to the outlet 106. The substrate element 108 contains an oval flow redistribution element 110 made out of an insulative material that thermally and physically separates the substrate into a central zone and a tubular outer zone surrounding the central zone. Each of the central zone and the outer zone is an extruded ceramic honeycomb coated with catalytic material and, but for the shapes and orientation to one another, and for the interposition of the insulative material, will be understood to be of conventional construction.

FIG. 1C shows a second exemplary embodiment, wherein four actuate segments 110a, 110b, 110c and 110d define the flow distribution element 110. Thus, here the insulative material does not physically separate the central zone and outer zone, but continues to thermally separate the same.

FIG. 1D shows the third exemplary embodiment, wherein the flow distribution element is cylindrical.

Figure 1E:
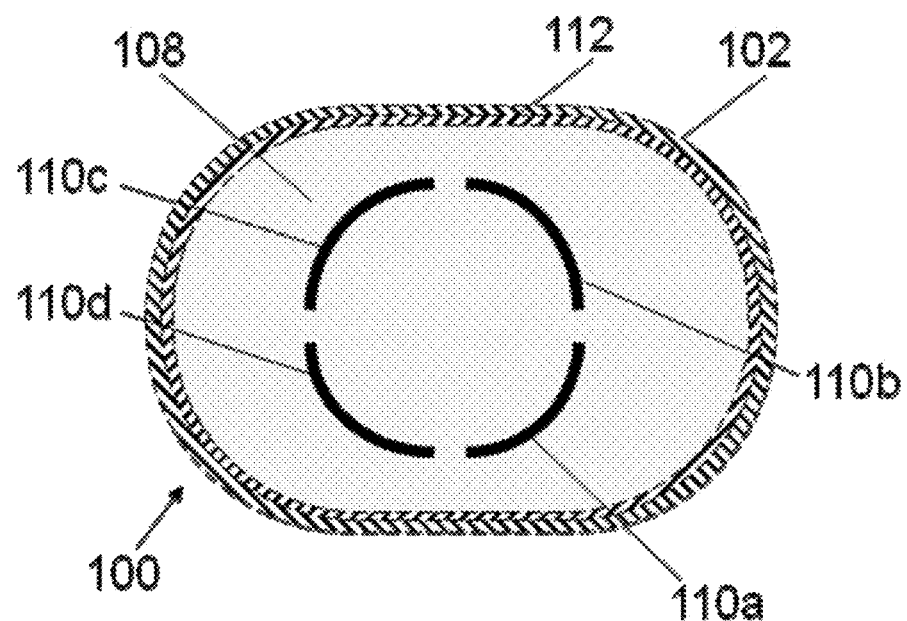
FIG. 1E is a view similar to FIG. 1B showing a fourth exemplary embodiment.

FIG. 1E shows the fourth exemplary embodiment wherein the flow distribution element is cylindrical and is defined by four segments 110a,110b,110c and 110d.

Although not clearly visible in the drawings, it should be understood that, in each embodiment illustrated, the substrate is a 400 cpi substrate, the thickness of the insulation material is the width of 2 cells and the ratio of the volume of the central zone to the outer zone is roughly 50:50.

The insulation material is adapted such that, in use and in an operating condition:
the gas flow through the modified substrate is characterized by a static pressure that, on the upstream-facing surface of the modified substrate: has a peak at a point generally central to the upstream-facing surface of the modified substrate; and as the upstream-facing surface extends radially away from the point to the periphery, decreases, but for (i) a surge, after the upstream-facing surface extends beyond the insulation material; and (ii) edge effects associated with the can;
as the upstream-facing surface extends radially away from the point towards the periphery, the gas static pressure thereon can initially decrease relatively slowly; as the upstream-facing surface further extends, to bridge the insulation material, the gas static pressure thereon can decrease relatively quickly as the upstream-facing surface traverses the insulation material; as the upstream-facing surface further extends, the gas static pressure thereon can then undergo said surge; and as the upstream-facing surface further extends, the gas static pressure thereon can then decrease relatively slowly, but for said edge effects associated with the can;

the temperature difference across the insulation material is between 25° C. and 300° C.; and the gas flow through the central zone is more evenly distributed than the gas flow that would pass therethrough if the insulation portion of the modified substrate was replaced with catalytic material.

The phrase "in an operating condition" as appears in this description and in the claims contemplates that, in normal operation, this condition occurs naturally and for a material portion of the normal operating cycle.

Reference is now made to the following description of tests and analyses carried out, which collectively provide an understanding as to the operation of the invention and demonstrate advantages thereof.

Aging Tests

Engine backpressure measurements were performed during on-engine aging cycles. A Ford Edge commercial catalytic converter for 3.5 L Duratec engine was used as the primary testing platform. This converter consists of a 900 CPSI front ceramic substrate and a 400 CPSI rear ceramic substrate, both 4.16" in diameter, and is close coupled to the engine. This vehicle exhaust system consists of two catalytic converters in parallel, one on each side of the engine, hereinafter referred to as left-hand side (LH) and right-hand side (RH) catalytic converter. Two sets of tests were performed approx. 18 months apart, each consisting of an unmodified (hereinafter sometimes referred to as baseline) catalytic converter and an identical catalytic converter modified to the inventive design (hereinafter referred to as prototype). Platinum Group Metal (PGM) and washcoat loading was identical for the baseline and prototype. Aging was conducted for 240 hours with up to 20 hours of downtime at constant engine RPM (2900±15) and exhaust temperature (1570° F.). Backpressure was recorded with a 1 Hz frequency during the entire aging cycle and was calculated by averaging the active part of the cycle where RPM and temperature were at an appropriate level.

Table 1 shows measured engine backpressure and fuel consumption results for the on-engine testing of Baseline and prototypes. It is believed that the two 400 CPSI prototypes provide an approximate measure of the backpressure generated by the rest of the exhaust system as they don't contribute to the backpressure themselves. Mass flow rates were calculated using air-to-fuel ratio 14.7±0.2, which ratio was obtained by measurement during the cycle.

TABLE 1

| Prototype | Backpressure (psi) | Fuel Cons. (gal/hour) | Mass Flow (kg/s) | Gas velocity (rel. to 400 prototype) |
|---|---|---|---|---|
| 400 CPSI Baseline | 0.49 ± 0.2 | 4.1 | 0.0494 | 102.7% |
| 400 CPSI prototype | 0.71 ± 0.2 | 4.0 | 0.0481 | 100% |
| 900 CPSI Baseline | 1.88 ± 0.2 | 4.7 | 0.0566 | 117.7% |
| 900 CPSI prototype | 0.91 ± 0.2 | 4.2 | 0.0506 | 105.2% |

The results show that the prototype exhibits significantly lower backpressure than the Baseline, producing only 48% of the engine backpressure.

These measurements overestimate the effectiveness of the prototype compared to the Baseline, as the Baseline has significantly higher fuel consumption (4.7 vs. 4.2 gal/hr) producing higher mass flow rate. To obtain a more accurate measure of backpressure reduction, the mass flow imbalance was corrected using Bernoulli's Law which states that the dynamic pressure $P=P_0+\rho v^2$, where $P_0$ is the static pressure in the system, $\rho$ is the gas density and $v$ is the gas velocity. Additional correction was done to account for the difference in the exhaust gas velocity leaving the catalytic converter. (The inventive design reduces the gas velocity of the gas exiting the catalytic converter, which means that any downstream components will generate less backpressure). The corrected values for the Baseline and the prototype yield 1.17 and 0.78 psi, respectively, a difference of 33%, (compared to 50% as measured).

Mileage Testing

The prototypes were tested on the Ford Edge vehicle with 3.5 L Duratec engine. Fuel economy for the combined FTP and US06 drivecycles was measured by weighing the $CO_2$ bag emissions. The results are shown in Table 2, representing two sets of prototypes. Additionally, the 2010 Baseline was retested to provide a comparison between the two sets of tests.

TABLE 2

| Prototype | FTP + US06 Fuel Economy (miles per gallon) | |
|---|---|---|
| 2010 900 CPSI Baseline (set #1) | 18.1 | 100% |
| 2012 900 CPSI Baseline (set #1) | 18.1 | 100% |
| 2012 900 CPSI Baseline (set #2) | 18.3 | 101% |
| 2010 900 CPSI prototype (set #1) | 18.9 | 104.5% |
| 2012 900 CPSI prototype (set #2) | 19.1 | 105.5% |

Prototypes show approx. 4.5% better fuel economy for both 2010 and 2012 prototype sets. 900 CPSI Baseline engine backpressure measurement was on the low end of the range expected by the manufacturer (2.0±0.25 psi). 2010 900 CPSI and 2012 900 CPSI Baselines showed good consistency (1.88 and 1.81 psi, respectively). The 900 CPSI prototype showed 20-30% improvement in backpressure once changes in gas flow due to fuel economy improvements are accounted for. The 900 CPSI prototype showed significantly improved fuel economy; approx. 5% for combined FTP and US06 drive cycles and 12% during aging at 2900 RPM. Engine feedback to the reduced backpressure significantly reduces fuel consumption, leading to further decrease in backpressure, producing a 50% backpressure difference between the 900 CPSI Baseline and the prototype (1.88 vs. 0.91 psi).

The fuel economy benefits of the prototype were found to be dependent on the engine load and RPM.

Figure 5:
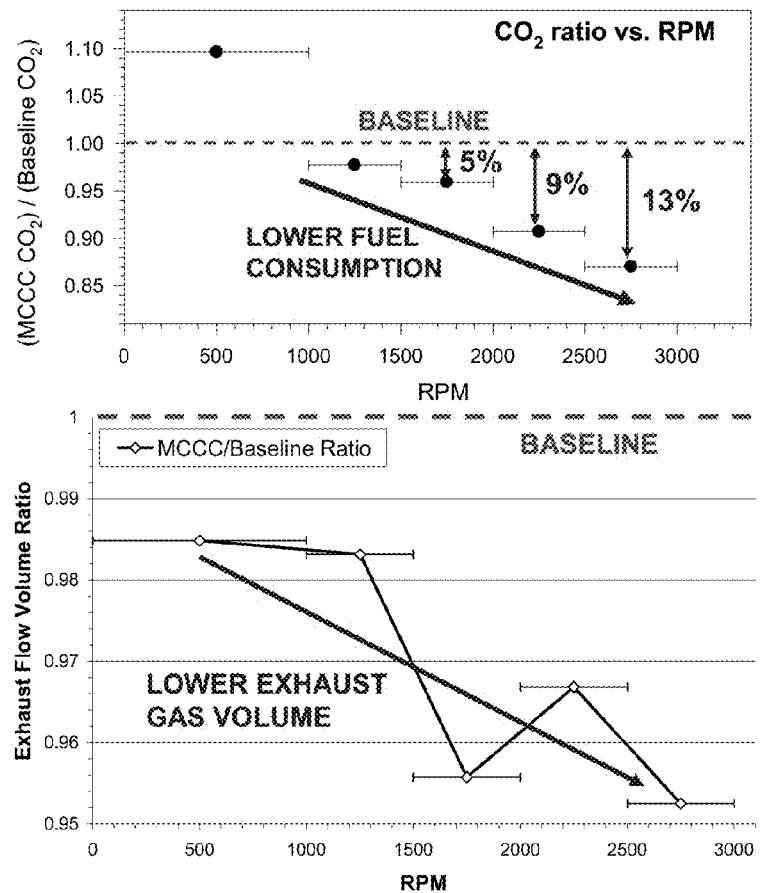
FIG. 5 is a comparison of baseline and prototype emissions during the FTP and US06 drivecycles

FIG. 5 is a comparison of 900 CPSI Baseline and 900 CPSI prototype $CO_2$ emissions (top) and exhaust gas volume (bottom) as a function of the RPM during the FTP and US06 drivecycles. For better statistical reliability the vehicle RPM was binned into 5 ranges, <1000, 1000-1500, 1500-2000, 2000-2500 and >2500 RPM. The RPM error bars indicate these ranges for each point. This figure (top) shows the dependence of $CO_2$ emissions on the vehicle RPM during the FTP and US06 drivecycles. These are a proxy for fuel consumption (higher consumption, higher $CO_2$ emissions) and they show that fuel economy benefits are more pronounced at higher engine RPM and they are accompanied by a reduction in measured exhaust gas volume.

This is consistent with the fuel economy benefits derived from backpressure reduction; the vehicle is required to push more exhaust gas through the catalytic converter at higher RPM, generating more backpressure and decreasing engine efficiency. These results are also consistent with the backpressure collected on the stationary engine at 2900 RPM where approx. 12% difference was observed between the 900 CPSI Baseline and the 900 CPSI prototype.

Road Testing:

Further testing was undertaken to verify the cross-platform applicability of the Prototype's fuel economy benefits. Two different test vehicles were used, a Ford F-150 with a 3.5 L EcoBoost engine and a Ford Fiesta with a 1.6 L engine. The vehicles were driven on a 60 km (37.3 mile) circular highway route at the speed of 115 km/h (72 mph) and their fuel consumption was recorded with a mass flow meter connected to a laptop computer data system. Average fuel consumption was recorded for each vehicle equipped with its original catalytic converter (baseline) and with the Prototype. Each test consisted of 5-8 runs for the baseline and the same number of runs for the Prototype. The Ford F-150 was further tested with a 900 kg (2000 lb) load in the truck bed. The testing results and the associated standard deviation are shown in Table 3.

TABLE 3

| | Prototype Fuel Economy Increase (%) |
|---|---|
| Ford Fiesta | 4.5 ± 0.7 |
| Ford F-150 (no load) | 4.6 ± 1.9 |
| Ford F-150 (2000 lbs load) | 6.8 ± 1.4 |

The results of the road testing are consistent with the previous laboratory testing on the Ford Edge vehicle. Furthermore, the Ford F-150 exhibits the same dependence of fuel economy benefit and vehicle loading observed in the laboratory.

Dynamometer Testing

Chassis dynamometer testing was carried out in respect of an F-250 6.7 L Powerstroke diesel engine vehicle. Comparative measurements were performed between the original catalytic converter (designated Base or Baseline here) and one modified to the inventive design (prototype). The original catalytic converter consisted of two Diesel Oxidation Catalyst ceramic substrates (6.5" diameter), two Selective Catalytic Reduction (SCR) catalysts (8" diameter) and a Diesel Particulate Filter (DPF, 8" diameter). The inventive design was applied to the two DOC substrates, leaving the SCR and the DOC unchanged. The DOC is the component closest to the engine and will redistribute any imbalances in the exhaust gas flow uniformity before the exhaust gas reaches the SCR and the DPF.

Two types of tests were performed. One was a steady state fuel economy and back pressure test, where these two parameters were measured concurrently during a steady-state 5-minute experiment with the vehicle speed of 96 km/hr (60 mph). Other was the peak power test, where vehicle was upshifted to $6^{th}$ gear at 1000-1100 RPM and put under maximum acceleration for approximately 10 seconds while various engine parameters (such as engine power, torque and backpressure) were recorded.

Table 4 shows comparative backpressure and fuel efficiency measurement on the modified F-250 6.7 L Powerstroke diesel engine. The two parameters are measured concurrently on a chassis dynamometer during a 5-minute run at 96 km/hr (60 mph). Values shown are the average for the steady state portion of the run, encompassing approximately 4 minutes.

TABLE 4

| Fuel Consumption | F-250 (10% load) (L/min) | F-250 (30% load) (L/min) |
|---|---|---|
| Prototype Run #1 | 0.1541 | 0.297 |
| Prototype Run #2 | 0.1540 | 0.303 |
| Prototype Run #3 | 0.1538 | 0.299 |
| Average | 0.1540 | 0.300 |
| Base Run #1 | 0.1620 | 0.332 |
| Base Run #2 | 0.1610 | 0.338 |
| Base Run #3 | 0.1628 | 0.337 |
| Average | 0.1619 | 0.336 |
| Prototype Benefit (%) | 5.1% | 11.2% |

| Backpressure | F-250 (10% load) (psi) | F-250 (30% load) (psi) |
|---|---|---|
| Prototype Run #1 | 0.49 | 1.06 |
| Prototype Run #2 | 0.43 | 0.76 |
| Prototype Run #3 | 0.57 | 0.92 |
| Average | 0.50 | 0.91 |
| Base Run #1 | 1.23 | 1.76 |
| Base Run #2 | 1.20 | 2.07 |
| Base Run #3 | 1.32 | 1.69 |
| Average | 1.25 | 1.86 |
| Prototype Benefit (%) | 60% | 51% |

The results summarized in Table 4 show consistently lower backpressure and lower fuel consumption with the prototype. Although the back pressure difference is slightly lower under 30% load, prototype fuel consumption benefit is higher. This is because back pressure-related increases in fuel consumption are higher at higher absolute back pressures; this creates higher levels of inefficiency to be recovered through the lower back pressure of the prototype.

FIGS. 15 through 18 show various results gathered during the chassis dynamometer tests.

Figure 15:
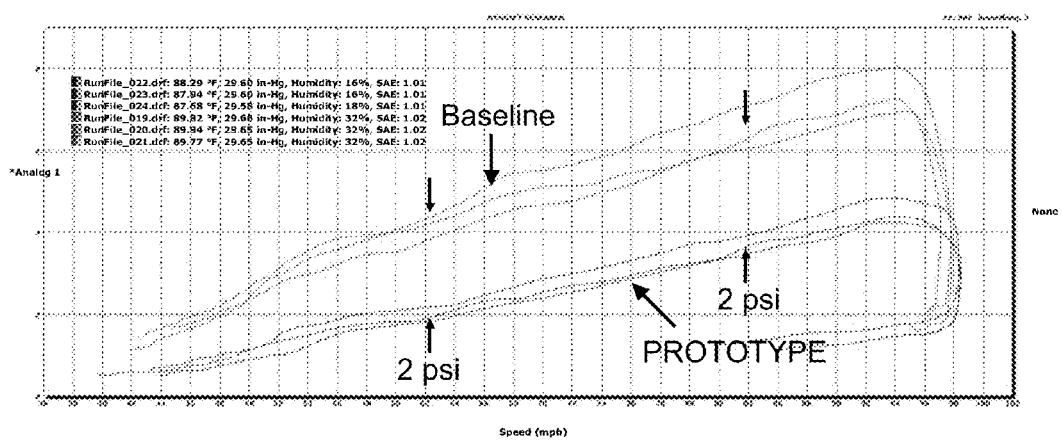
FIG. 15 is a plot showing backpressure pounds-per-square-inch (psi) during a peak power test of an embodiment of the invention on a chassis dyno

FIG. 15, which is a comparison of backpressure pounds-per-square-inch (psi) during a peak power test, demonstrates that the prototype shows a consistent 2 psi advantage.

Figure 16:
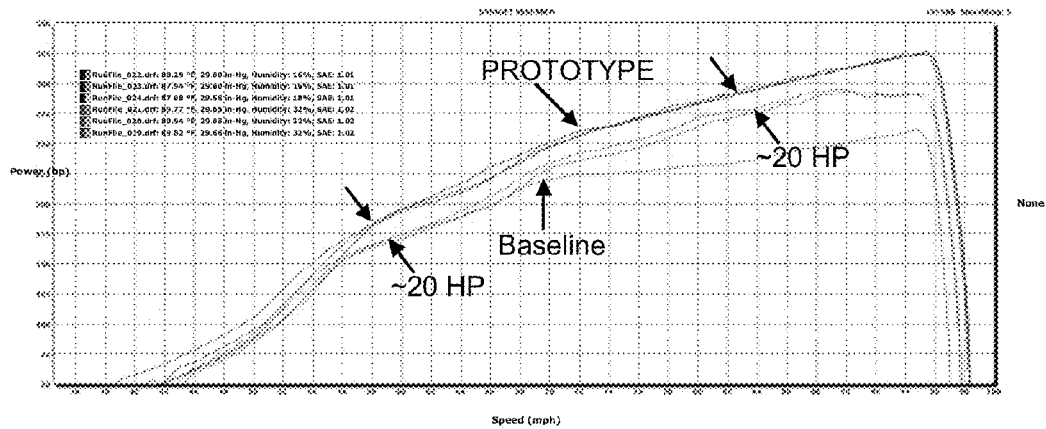
FIG. 16 is a plot comparing engine power in horsepower (HP) during the peak power test

FIG. 16, which is a comparison of engine power in horsepower (HP) during a peak power test, demonstrates that the prototype shows a consistent 20 HP advantage from 175 to 325 HP.

Figure 17:
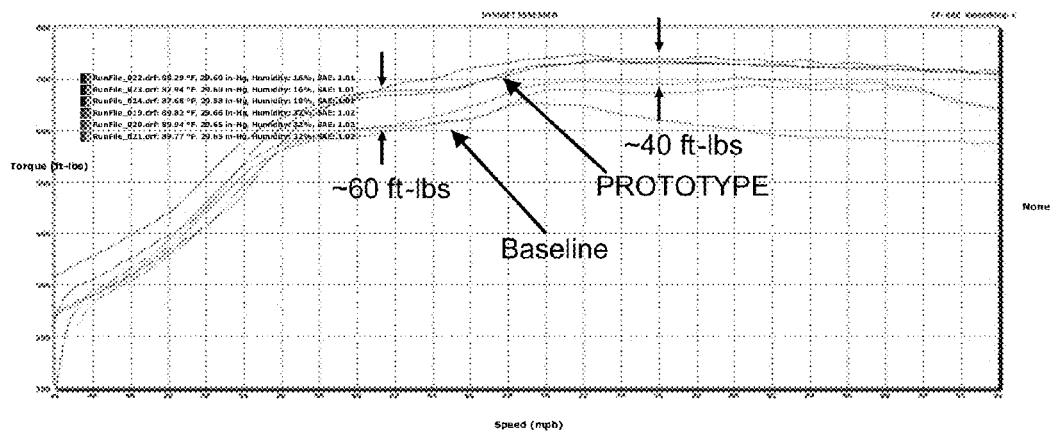
FIG. 17 is a plot comparing engine torque in foot-pounds (ft-lbs) during the peak power test.

FIG. 17, which is a comparison of engine torque in foot-pounds (ft-lbs) during a peak power test, demonstrates the prototype shows a consistent 40-60 ft-lbs advantage.

Figure 18:
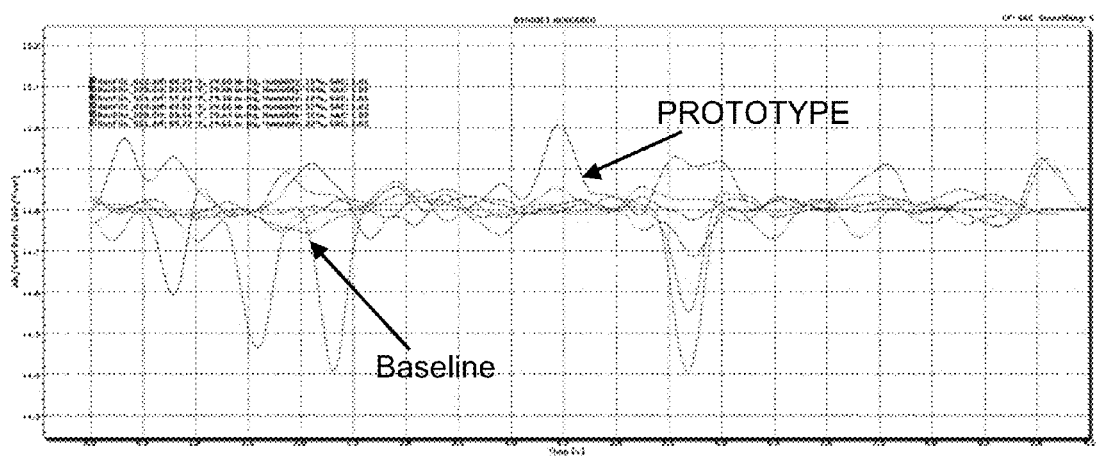
FIG. 18 shows air-to-fuel ratio during the peak power test.

FIG. 18, which shows air-to-fuel ratio during the peak power test, demonstrates no difference between the prototype and Baseline.

Modeling

Computation Fluid Dynamics (CFD) simulations investigating the cause of the backpressure reduction in the prototype were conducted on two generic under-the-floor catalytic converter designs. The simulated system was a room temperature (cold flow) axial symmetric system, with equal inlet and outlet pipes and two equal ceramic substrates. The permeability of the substrates was varied over a wide range of values to account for all currently conventional substrate cell densities and wall thicknesses. Inlet gas flow velocity was also varied over a wide range to simulate a range of engine loads that might be experienced by the vehicle in normal operating conditions.

Figure 6:
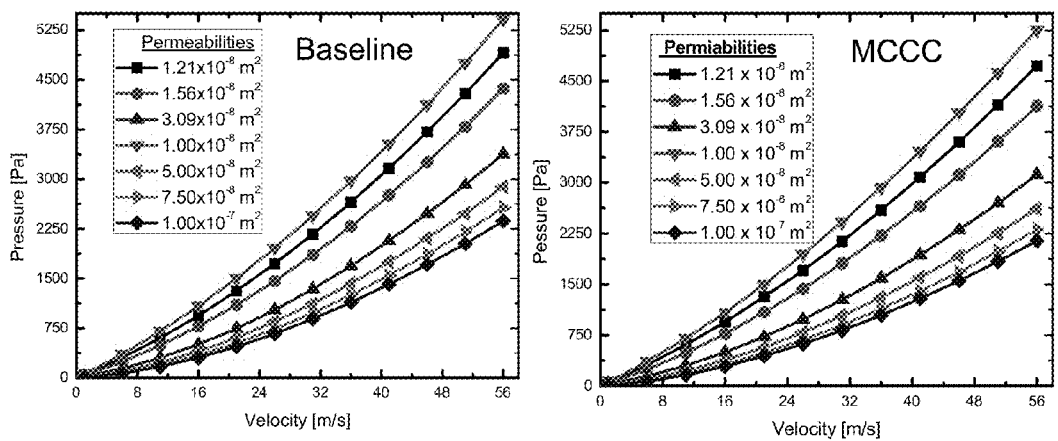
FIG. 6 is an overview of CFD simulations of a baseline and a prototype

FIG. 6 is an overview of the results of the simulations, showing the range of permeabilities and gas velocities used in the study, and it will be seen that the prototype exhibits lower backpressure under most engine conditions and substrate permeabilities.

Figure 7:
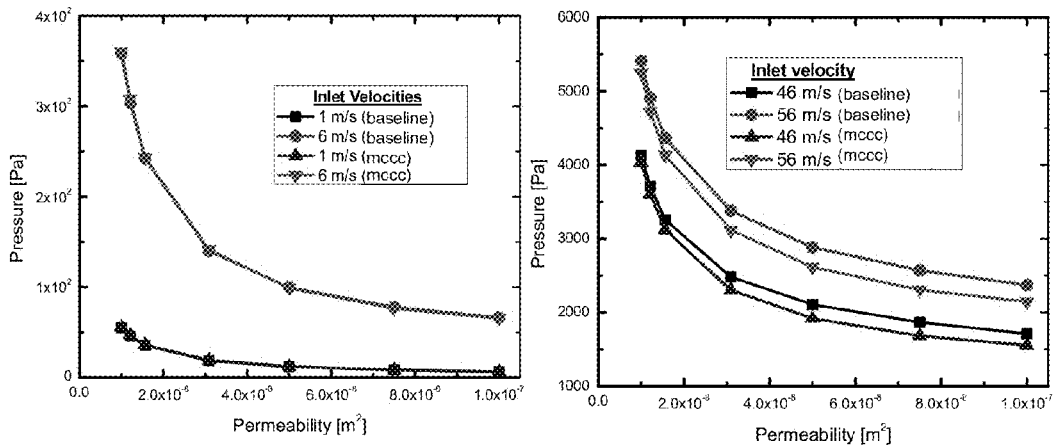
FIG. 7 shows plots of gas permeability to pressure at low (left) and high (right) gas flow velocities.

FIG. 7 contrasts the backpressure reduction at low (left) and high (right) gas flow velocities, and herein it will be seen that at low velocities there is little difference between the Baseline and the prototype, but a pronounced difference at high gas flows.

Figure 8:
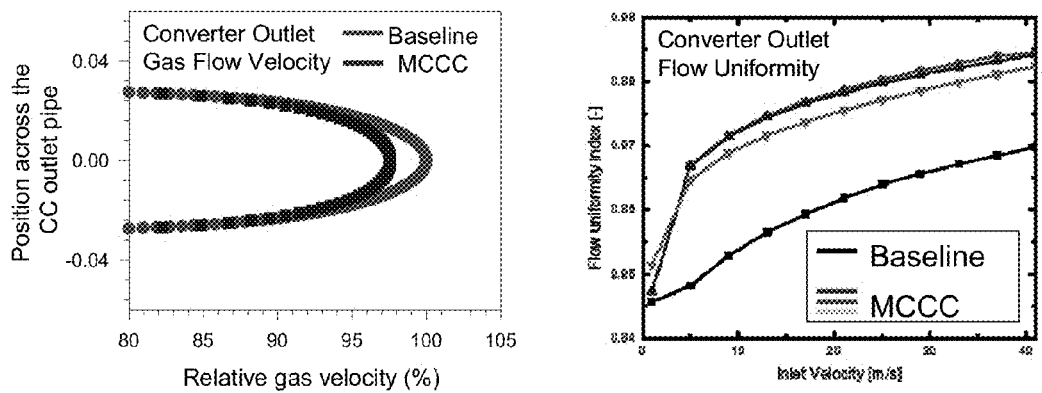
FIG. 8 are plots of outlet velocities (left) and flow uniformities (right) in the baseline and the prototype FIG. 9 are plots of time and temperature difference between central and peripheral zones in a conventional (left) and prototype (right) converter measured during the FTP drive cycle testing on a 2010 Ford Edge FIG. 10 are plots of temperature differential between the central and the peripheral zones of the prototype during acceleration portions of the FTP drivecycle.

FIG. 8 compares outlet velocities (left) and flow uniformities (right) in the baseline and prototype, and herein, it is seen that, under all operating conditions, the prototype outlet gas flow velocity is lower than the baseline, and flow uniformity is also higher under all inlet gas flow velocities. This will result in reduced backpressure downstream and is especially beneficial with close-coupled systems.

Figure 9:
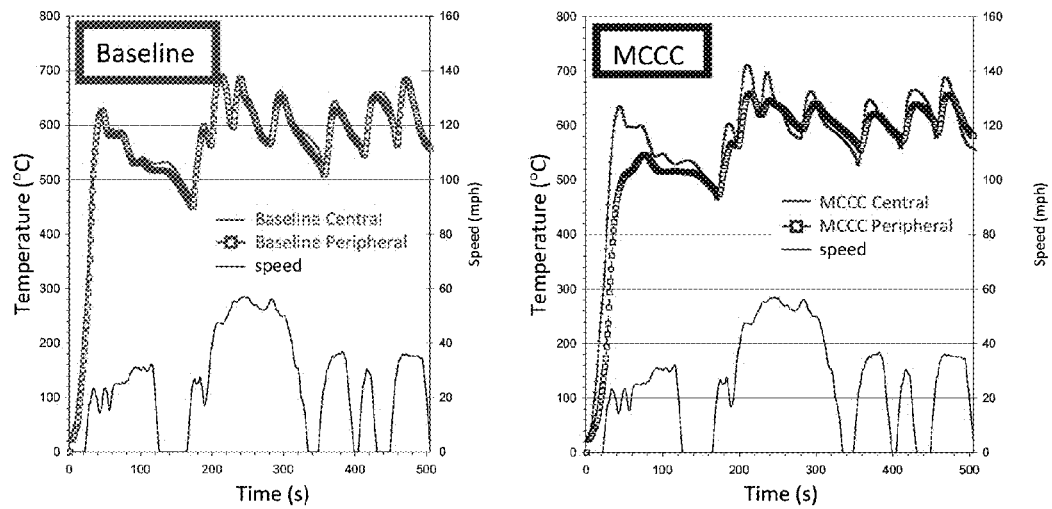

FIG. 9 shows temperature differences between the central and the peripheral zones in the conventional catalytic converter (left) and the prototype (right) measured during the FTP drive cycle testing on the 2010 Ford Edge. The border between the two zones is defined by the position of the insulation in the prototype. Herein, it will be seen that the presence and location of the insulation in the prototype creates a significant temperature differential between the two sides of the insulation.

Further CFD modelling was also carried out. In this model, a catalytic converter was modelled. The converter consisted of two 400 CPSI substrates, 4.8" in diameter (12.2 cm), spaced 0.4" (1 cm) apart. The modelled header was 39.4" long (1 meter) with a diameter of 2.1" (5.4 cm). The model outlet pipe was 11.8" (30 cm) in length with the same 2.1" diameter. In the model, both the diffuser and the connector have a 45 degree angle and there is 0.15" padding between the substrates and the converter wall. Modelled exhaust gas flow was 0.426 kg/s and 910 Celsius, approximating highway driving conditions.

Figure 13:
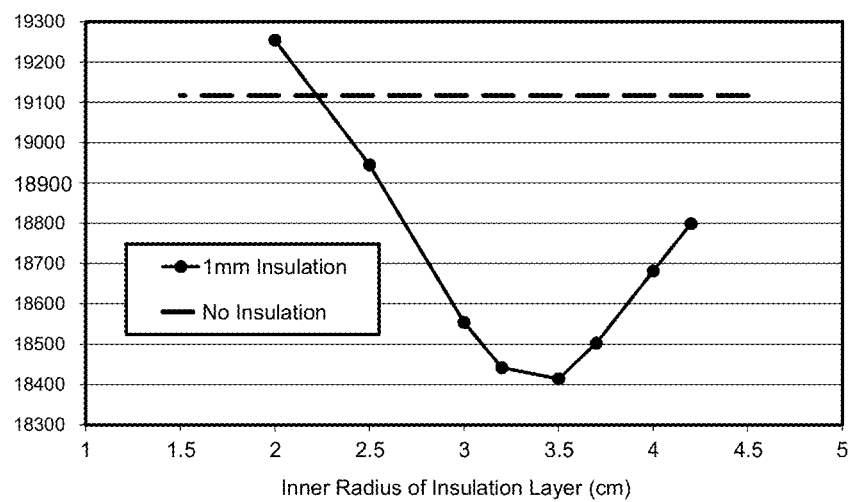
FIG. 13 is a plot showing engine back pressure as a function of insulating layer position
Figure 14:
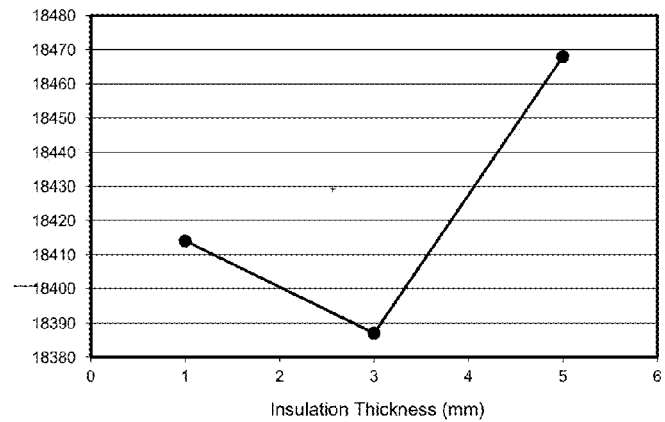
FIG. 14 is a plot showing back pressure effects as the function of insulating layer thickness
Figure 19:
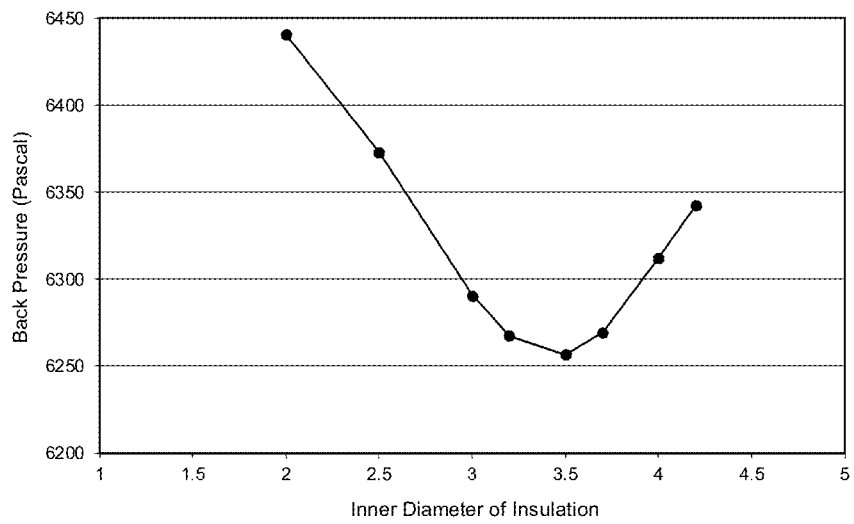
FIG. 19 is a plot showing engine back pressure as a function of insulating layer position.

The results of the simulations are shown in FIGS. 13, 14 and 19.

FIG. 13 shows engine back pressure as a function of insulating layer position. In this simulation, insulation thickness is 0.12", the dashed line represents back pressure in the absence of the insulating layer, exhaust gas flow 0.426 kg/s, approximating highway driving conditions and the exhaust gas temperature is 910 Celsius.

FIG. 14 shows back pressure effects as the function of insulating layer thickness modeled at the optimum insulation diameter of 2.75". Three insulation thicknesses 0.04" (1 mm), 0.12" (3 mm) and 0.20" (5 mm) were modeled.

FIG. 19 shows engine back pressure as a function of insulating layer position. In this simulation, insulation thickness is 0.12", the dashed line represents back pressure in the absence of the insulating layer, exhaust gas flow is 0.229 kg/s, approximating highway driving conditions and the exhaust gas temperature is 538 Celsius.

FIGS. 13 and 14 demonstrate clear optimization of the engine backpressure when the insulation diameter is 2.75". Good results, <75% of the maximum effect, are obtained with the insulation diameter between 2.3" and 3.1". An insulation thickness of 0.12" (3 mm) appears optimum in this application.

FIG. 19 shows that the optimal position of the insulation remains unchanged independent of the driving conditions (gas flow and temperature). These results clearly demonstrate that, while the invention is able to provide backpressure reduction with a variety of insulation positions and thicknesses, maximum performance can be obtained by optimizing these two parameters. These parameters will apply at all driving conditions.

Theoretical

The mass flow rate of gas through a channel can be approximated by $$\dot{m} = \frac{dV}{dt}\rho = \frac{R^4 \pi}{8\eta} \frac{\Delta P}{L} \rho \quad (1)$$

where R is the channel diameter, $\Delta P$ is the pressure differential between the two ends of the channel, $\eta$ is dynamic gas viscosity, L is the length of the channel and $\rho$ is the gas density.

Of these factors the most relevant for the performance of the catalytic converter are the pressure differential, gas viscosity and gas density:

Effects of the pressure differential have been previously discussed, and it will be recalled that an increase in pressure differential results in a higher gas flow rate Viscosity of the exhaust gas, generally referred to as dynamic viscosity ($\eta$), is inversely proportional to the gas flow rate, i.e. lower viscosity results in a higher flow rate Gas density is directly proportional to the exhaust flow rate.

Dynamic viscosity ($\eta$) and density ($\rho$) can be combined into kinematic viscosity ($\nu$), equal to the ratio of the two ($\nu = \eta/\rho$).

The equation for the mass flow rate of the gas through the channel can then be rewritten as:

$$\dot{m} = \frac{R^4 \pi}{8\nu} \frac{\Delta P}{L} \quad (2)$$

Dynamic viscosity of air increases with increasing temperature, while its density decreases. So a gas at a higher temperature would have a lower flow rate through the same channel with the same pressure differential. Kinematic viscosity is especially convenient in expressing the temperature effects as it incorporates both the viscosity and the density changes with the temperature.

Insulation divides the substrate into two distinct zones: a hot zone which is exposed to the direct flow of the exhaust gas coming from the catalytic converter inlet pipe and is directly heated by the hot gas; and a cold zone which is exposed only to the axial flow of the exhaust gas and is heated by a combination of the hot gas and heat transfer from the hot zone. Typically, the hot zone will also be the location of the large high pressure area and so, in order to achieve back pressure reduction, it is necessary to redistribute the gas from the hot zone to the cold zone.

In a conventional catalytic converter there is no barrier to heat flow between the two zones and the temperature differentials are generally very gradual. In the prototype, insulation forms a barrier that creates a large (25-300° C.) temperature differential across a small distance, the width of the insulation. Lower temperature in the cold zone of the prototype means that, even with the same pressure distribution across the front face of the substrate, exhaust gas flow rate through this zone will be higher in the prototype than in a conventional catalytic converter.

Table 4 shows the dynamic ($\eta$) and kinematic ($\nu$) viscosity of air at different temperatures, highlighting the magnitude of viscosity change with varying temperature.

TABLE 4

| Temp. (° C.) | η(air) | v(air) |
| --- | --- | --- |
| 75 | 2.075 | 20.76 |
| 125 | 2.286 | 25.9 |
| 175 | 2.484 | 28.86 |
| 225 | 2.671 | 37.9 |
| 275 | 2.848 | 44.34 |
| 325 | 3.018 | 51.34 |
| 375 | 3.177 | 58.51 |
| 425 | 3.332 | 66.25 |
| 475 | 3.481 | 73.91 |
| 525 | 3.625 | 82.29 |
| 575 | 3.765 | 90.75 |
| 625 | 3.899 | 99.3 |
| 675 | 4.023 | 108.2 |
| 725 | 4.152 | 117.8 |

From this, it will be seen that the kinematic viscosity difference with a 100° C. temperature difference is large, even at high temperatures. Between 225 and 325° C. the difference is 26%, dropping to 17% between 525 and 625° C. and 16% between 625 and 725° C.

Figure 10:
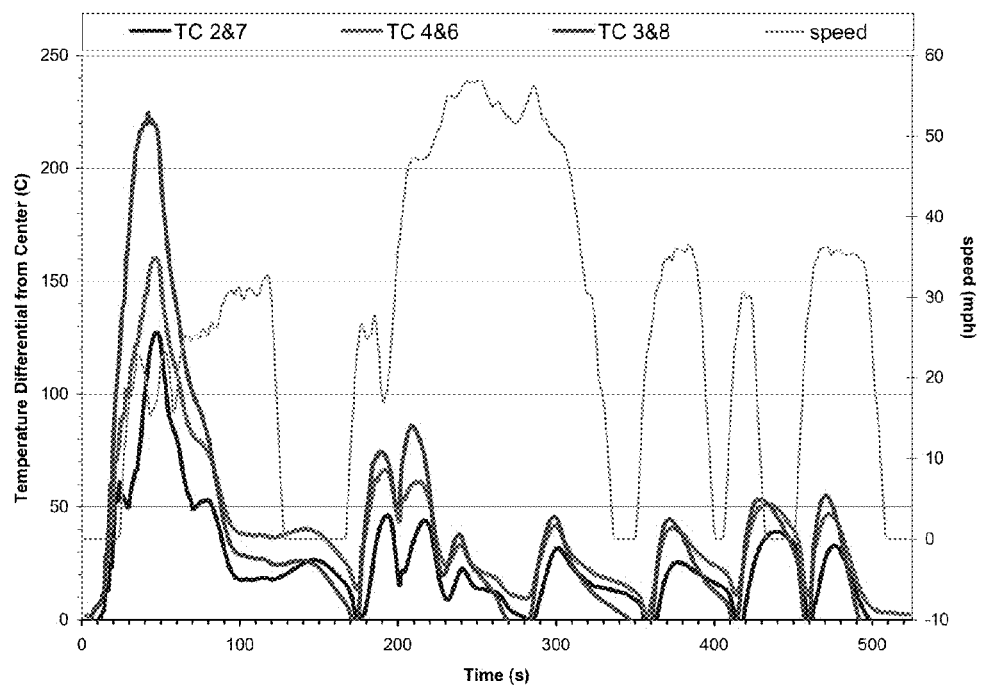

FIG. 10 shows temperature differential between the central and the peripheral zones of the prototype during acceleration portions of the FTP drivecycle. As shown, typical temperature difference during acceleration in the FTP drivecycle is approx. 50° C., with spikes up to 250° C. during aggressive acceleration. This is will result in kinematic viscosity difference of at least 8% and typically between 10 and 15%, even at the very high temperature end.

Figure 11:
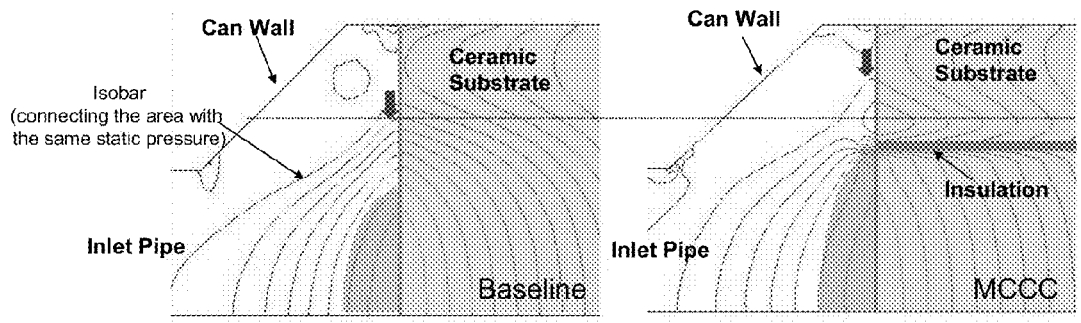
FIG. 11 are isobaric plots of the front section of the catalytic converter model under highway driving conditions (mass flow rate=0.05 kg/s) on a hot flow model, including temperature effects, the baseline being shown on the left and the prototype on the right.

The present invention takes advantage of the reduced viscosity obtained by the insulation by a redistribution of the gas flow from the central zone towards the peripheral zone, as evidenced by FIG. 11, which is an isobaric plot of the front section of the catalytic converter model under highway driving conditions (mass flow rate=0.05 kg/s) on a hot flow model, including temperature effects. Baseline is shown on the left and the prototype on the right. The isobaric plot clearly shows the difference in the shape of the high pressure area on the front face of the ceramic substrate (highlighted in red), which produces the flow redistribution across the face of the substrate.

Generally this mechanism can be represented as merging of the two high pressure areas, one in the centre of the ceramic substrate and the other in front of the impermeable insulating layer. The incoming gas jet from the inlet pipe will hit the face of the ceramic substrate, creating a high pressure area at the centre of the substrate that deflects a portion of the incoming flow to the outside of the substrate. In the prototype there is an additional high pressure area in front of the impermeable insulating layer, which can merge with the central high pressure area. The newly formed high pressure area has a much wider base then in the Baseline, providing better deflection of the incoming gas, thus generating higher axial flow and redistributing the gas flow more evenly across the face of the substrate.

The flow redistribution is helped by the lower kinematic gas viscosity of the channels in the peripheral zone of the prototype. As shown in the equation (2), even when the pressure differential across the channel is the same as in the conventional catalytic converter, lower viscosity will result in 10-30% higher gas flow rate in the peripheral zone of the prototype.

Figure 12:
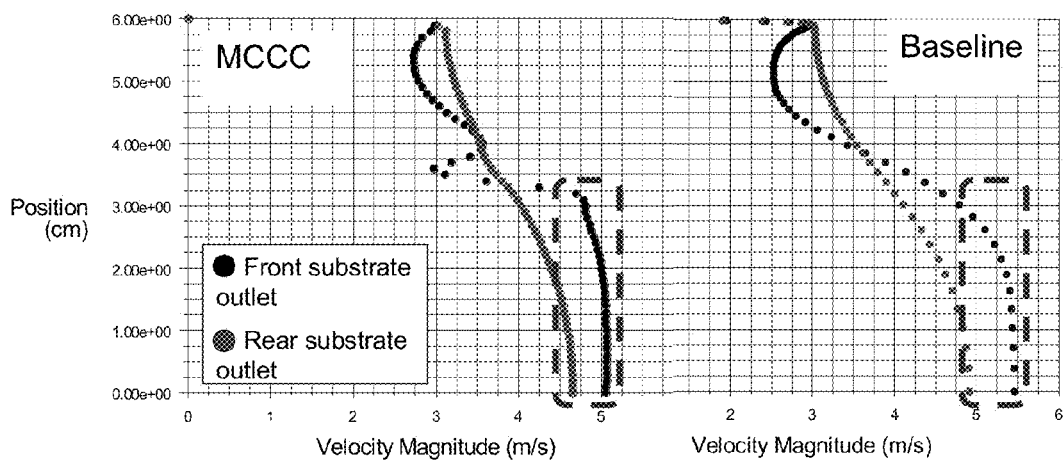
FIG. 12 is a comparison of flow velocities in a prototype (left) and baseline (right)

The more even flow distribution in the prototype is evident from FIG. 12 as well, which represents the flow velocity distribution in a temperature dependent CFD model (hot flow). Pressure and temperature uniformity in the central zone of the prototype produce a remarkably even flow in that portion of the prototype substrate. More importantly the peak gas flow velocity is 10% lower and the lowest gas flow velocity is 10% higher in the prototype, with the associated benefits on the downstream exhaust system components. As evidenced in FIG. 12, the flow velocity through the substrate is directly proportional to the pressure on the front face of the substrate, this is representative of the pressure distribution across the face of the substrate. Flow velocity across the centre portion of the prototype substrate is fairly constant, a consequence of a wide, evenly distributed high pressure area, but the flow velocity across the centre portion of the Baseline shows a narrower high pressure area, producing a higher peak pressure and therefore higher backpressure.

Design Optimization

One of the advantages of the prototype design is that the physical forces involved in the exhaust gas flow redistribution will tend to automatically increase to correct an increased flow maldistribution. For example, in a catalytic converter with a bent inlet pipe the exhaust gas flow will be coming into the catalytic converter at an angle and the high pressure area will be offset to the side of the substrate. In this case, the temperature differential between the high pressure area and the near edge of the substrate will be smaller than the differential between the high pressure area and the far edge. The exhaust gas viscosity will be lower at the far edge of the substrate and will drive more of the exhaust gas through that side of the substrate, correcting the flow maldistribution.

Optimized flow through the prototype allows a reduction in catalytic converter and exhaust pipe diameters. An approximate estimate of the reduction can be obtained using equation (2):

$$\dot{m} = \frac{R^4 \pi}{8 v} \frac{\Delta P}{L} \tag{2}$$

where R is the channel diameter, ΔP is the pressure differential between the two ends of the channel, η is dynamic gas viscosity, L is the length of the channel and v is the gas kinematic viscosity. When considering the overall vehicle exhaust system the pressure differential ΔP represents the engine manifold backpressure and R is the catalytic converter and exhaust piping diameter. Since the exhaust gas temperature is very similar through most of the exhaust system (other than local differences in the prototype catalytic converter) viscosity is virtually identical between the two systems. Therefore it is possible to calculate the relative reduction in catalytic converter and exhaust piping diameter that would produce the same fuel consumption characteristics in a smaller package. The ratio of the two diameters (Baseline to prototype) corresponds to the ratio of backpressures to ¼(equation 3).

$$\frac{R_{Base}}{R_{MCCC}} = \left(\frac{\Delta P_{MCCC}}{\Delta P_{Base}}\right)^{\frac{1}{4}} \tag{3}$$

Table 5 shows approximate reductions of the catalytic converter and exhaust piping diameter that can be accommodated as a function of the backpressure reduction. In the Table, Backpressure reduction of 0% represents the original size and reductions of up to 40% are considered. Backpressure reduction of 30% at the same fuel consumption and therefore mass flow rate should be possible with the prototype based on the experimental data.

TABLE 5

| Backpressure Differential (%) | Catalytic Converter Diameter (inches) | Exhaust Piping Diameter (inches) |
|---|---|---|
| 0 | 4.66 | 2.50 |
| 5 | 4.60 | 2.47 |
| 10 | 4.54 | 2.43 |
| 15 | 4.47 | 2.40 |
| 20 | 4.41 | 2.36 |
| 25 | 4.34 | 2.33 |
| 30 | 4.26 | 2.29 |
| 35 | 4.18 | 2.24 |
| 40 | 4.10 | 2.20 |

Reduction in catalytic converter and exhaust system size is sometimes desirable over the backpressure reduction and offers additional benefits to the car manufacturers.

Overall, the invention offers a solution that is very robust and adaptable. Benefits can be derived by optimizing the vehicle performance to take advantage of the prototype unique capabilities. Without limitation, these can be any or all of:

reduced PGM usage
smaller, lower weight exhaust systems
better fuel efficiency

Whereas the exemplary illustrated embodiments are shown to be generally cylindrical and concentric, the insulation ring could be offset from centre, if the jet of hot exhaust gas in a particular exhaust system were offset, as is the case in some close-coupled systems.

As well, the insulation could be oval, to align with oval systems, or a square or rectangular channel, to match certain systems which have this configuration.

Additionally, whereas in the illustrated embodiments, the substrate is a 400 cpi substrate and the insulation is the width of 2 cells, other substrates can be used. For example, in the context of a 900 cpi substrate, insulation the width of 3 cells is known to have utility.

Further, whereas in some of the illustrated embodiments, the ratio of the volume of the outer zone to the central zone is 50:50, a ratio falling in the range 40:60 to 60:40 is known to have utility. In order to achieve optimum performance one must size the insulation diameter larger than the inlet diameter, to account for expansion of the exhaust flow jet. Without intending to be bound by theory, it is believe that if the insulation diameter is at least 0.5" larger than the inlet diameter, it will contain the exhaust flow jet coming from the inlet within the central zone in most typical automotive applications. To obtain maximum temperature gradient across the insulating layer, the relative mass of inner zone should be between 40% and 60%, but as close to 40% as possible while containing the exhaust gas jet within the inner zone. Having a larger outer zone provides more thermal inertia to that zone and will create a larger temperature gradient.

While thinner insulation is generally preferred, as demonstrated in FIG. 14 by the sharp increase in back pressure as the insulation thickness increases from 0.12" to 0.20", reducing the thickness too much results in less than optimum results. Insulation diameter and thickness directly affect the magnitude of the temperature gradient that is primarily responsible for the back pressure reduction in the MCCC. Insulation diameter will control the ratio of thermal mass between the two zones and positioning versus the hot exhaust gas jet coming from the catalytic converter inlet. Insulation thickness controls the thermal flow between the two zones and needs to be thick enough to restrict the flow and maximize the thermal gradient. Once the insulation is thick enough to achieve this goal, further increase is detrimental to the performance as it leads to unnecessary loss of flow area.

Whereas the disclosure contemplates single layers of insulation, it should be understood that some catalytic converters receive multiple distinct gas jets. In these instances, multiple tubes of insulative material would be deployed, one for each incoming gas jet.

Whereas the experimental data suggests optimum insulation thickness is between 0.10" and 0.15", this will exhibit dependence on the thermal conductivity of the insulation. Without intending to be bound by theory, this should hold true as long as the thermal conductivity of the insulation is at least 6 times smaller than that of the substrate ceramics.

Yet further variations are possible.

Accordingly, the invention should be understood as limited only by the accompanying claims, purposively construed.

The invention claimed is:

1. An improved catalytic substrate for use with a can in an automotive exhaust system, the substrate being of the type which is disposed in use in the can, the improvement comprising:

an insulation material thermally separating the substrate into a central zone and an outer zone surrounding the central zone, the insulation material, central zone and outer zone collectively defining a modified substrate, the insulation material being adapted such that, in an operating condition, the gas flow through the modified substrate is characterized by a static pressure that, on the upstream-facing surface of the modified substrate, has a peak at a point generally central to the upstream-facing surface of the modified substrate as the upstream-facing surface extends radially away from the point to the periphery, decreases, but for a surge, after the upstream-facing surface extends beyond the insulation material; and edge effects associated with the can.

2. Apparatus according to claim 1, characterized in that, in said operating condition: as the upstream-facing surface extends radially away from the point towards the periphery, the gas static pressure thereon initially decreases relatively slowly; as the upstream-facing surface further extends, to bridge the insulation material, the gas static pressure thereon decreases relatively quickly as the upstream-facing surface traverses the insulation material; as the upstream-facing surface further extends, the gas static pressure thereon then undergoes said surge; and as the upstream-facing surface further extends, the gas static pressure thereon then decreases relatively slowly, but for said edge effects associated with the can.

3. Apparatus according to claim 1, wherein each of the insulation material and the outer zone is tubular.

4. Apparatus according to claim 1, wherein the ratio of the volume of the central zone to the volume of the outer zone can fall in the range 60:40 to 40:60.

5. Apparatus according to claim 1, wherein the insulation material is adapted such that, in said operating condition, the temperature difference across the insulation material is at least 25° C.

6. Apparatus according to claim 1, wherein the insulation material is adapted such that, in said operating condition, the temperature difference across the insulation material is between 25° C. and 300° C.

7. Apparatus according to claim 1, characterized in that, in said operating condition, the gas flow through the central zone is more evenly distributed than the gas flow that would pass therethrough if the insulation portion of the modified substrate was replaced with catalytic material.

8. Apparatus according to claim 1, characterized in that, in said operating condition, the gas flow through the outer zone is higher than the gas flow that would pass therethrough if the insulation portion of the modified substrate was replaced with catalytic material.

9. An improved catalytic substrate for use with a can in an automotive exhaust system, the substrate being of the type which is disposed in use in the can, the improvement comprising:
   an insulation material thermally separating the substrate into a central zone and a tubular outer zone surrounding the central zone, the insulation material, central zone and outer zone collectively defining a modified substrate, the insulation material being adapted such that, in an operating condition, the temperature difference across the insulation material is at least 25° C.

10. An improved substrate according to claim 9, wherein the thickness of the insulation material is the width of 2 or 3 cells.

11. An improved substrate according to claim 9, wherein the ratio of the volume of the central zone to the volume of the outer zone is in the range 60:40 to 40:60.

12. An improved substrate according to claim 9, wherein the thickness of the insulation material is between 0.10" and 0.15".

13. A method for providing for treatment of emissions from an internal combustion engine, comprising the step of:
   providing a catalytic converter to receive the exhaust gases from the engine, the converter having
      a central zone;
      a tubular outer zone surrounding the central zone; and
      an insulation material disposed intermediate the central zone and the outer zone and adapted such that, in use, the gas flow through the modified substrate is characterized by a static pressure that, on the upstream-facing surface of the modified substrate,
         has a peak at a point generally central to the upstream-facing surface of the modified substrate
      as the upstream-facing surface extends radially away from the point to the periphery, decreases, but for a surge, after the upstream-facing surface extends beyond the insulation material; and
      edge effects associated with the can.

14. A method according to claim 13, characterized in that, in said operating condition: as the upstream-facing surface extends radially away from the point towards the periphery, the gas static pressure thereon initially decreases relatively slowly; as the upstream-facing surface further extends, to bridge the insulation material, the gas static pressure thereon decreases relatively quickly as the upstream-facing surface traverses the insulation material; as the upstream-facing surface further extends, the gas static pressure thereon then undergoes said surge; and as the upstream-facing surface further extends, the gas static pressure thereon then decreases relatively slowly, but for said edge effects associated with the can.

15. A method according to claim 13, wherein each of the insulation material and the outer zone is tubular.

16. A method according to claim 13, wherein the ratio of the volume of the central zone to the volume of the outer zone falls in the range 60:40 to 40:60.

17. A method according to claim 13, wherein the insulation material is adapted such that, in said operating condition, the temperature difference across the insulation material is at least 25° C.

18. A method according to claim 13, wherein the insulation material is adapted such that, in said operating condition, the temperature difference across the insulation material is between 25° C. and 300° C.

19. A method according to claim 13, characterized in that, in said operating condition, the gas flow through the central zone is more evenly distributed than the gas flow that would pass therethrough if the insulation portion of the modified substrate was replaced with catalytic material.

20. A method according to claim 13, characterized in that, in said operating condition, the gas flow through the outer zone is higher than the gas flow that would pass therethrough if the insulation portion of the modified substrate was replaced with catalytic material.

21. A method according to claim 13, wherein the thickness of the insulation material is the width of 2 or 3 cells.

22. A method according to claim 13, wherein the thickness of the insulation material is between 0.10" and 0.15".

* * * * *